United States Patent
Lee et al.

(10) Patent No.: US 8,243,699 B2
(45) Date of Patent: *Aug. 14, 2012

(54) MULTI-CHANNEL MAC METHOD FOR WLAN DEVICES WITH A SINGLE RADIO INTERFACE AND SYSTEM FOR IMPLEMENTING THE SAME

(75) Inventors: Sung-Won Lee, Seoul (KR); Jun-Seo Lee, Seoul (KR); Rakesh Taori, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1130 days.

This patent is subject to a terminal disclaimer.

(21) Appl. No.: 11/442,597

(22) Filed: May 30, 2006

(65) Prior Publication Data

US 2006/0280152 A1   Dec. 14, 2006

Related U.S. Application Data

(60) Provisional application No. 60/685,537, filed on May 31, 2005.

(30) Foreign Application Priority Data

May 29, 2006   (KR) .................. 10-2006-0047945

(51) Int. Cl.
*H04W 4/00* (2009.01)
(52) U.S. Cl. ......... 370/338; 370/311; 370/329; 370/466
(58) Field of Classification Search .................. 370/338, 370/311, 329, 466
See application file for complete search history.

(56) References Cited

U.S. PATENT DOCUMENTS

| 2003/0152058 | A1* | 8/2003 | Cimini et al. ............... 370/338 |
| 2005/0094607 | A1 | 5/2005 | Zaki et al. |
| 2006/0146718 | A1* | 7/2006 | Yarvis et al. ............... 370/238 |

FOREIGN PATENT DOCUMENTS

KR   10-2005-0024744 A   3/2005

OTHER PUBLICATIONS

Jing Zhu et al., "802.11 Mesh Networks with Two-Radio Access Points," Communications, 2005. ICC 2005. *2005 IEEE*, International Conference vol. 5; 16-17; May 2005; pp. 3609-3615.
S.M. Faccin et al., "Mesh WLAN Networks: Concept and System Design," *IEEE, Wireless Communication*, vol. 13; Issue 2; Apr. 2006; pp. 10-17.
Shiann-Tsong Sheu et al. "Wireless Switch Protocol," Communications, 2003. ICC '03. *IEEE* International Conference, vol. 1; May 2003; pp. 127-131.
Zhai, Hongqiang, et al., "A Dual-Channel MAC Protocol for Mobile Ad Hoc Networks," Proceedings of Global Telecommunications Conference Workshops, 2004 (6 pages, in English).

* cited by examiner

*Primary Examiner* — Kamran Afshar
*Assistant Examiner* — Sayed T Zewari
(74) *Attorney, Agent, or Firm* — NSIP Law

(57) ABSTRACT

A multi-channel media access control (MAC) method for Wireless Local Area Network (WLAN) devices with single radio interface is provided. The method includes starting a channel coordination window (CCW) that is repeated with a period P, allocating an arbitrary WLAN device pair on a common channel to a destination channel by using a channel utilization vector that indicates whether each of N channels is occupied or available during CCW, and switching the arbitrary WLAN device pair to the destination channel.

24 Claims, 6 Drawing Sheets

MULTI-CHANNEL MAC METHOD FOR WLAN DEVICES WITH A SINGLE RADIO INTERFACE AND SYSTEM FOR IMPLEMENTING THE SAME

CROSS-REFERENCE TO RELATED APPLICATIONS

This application claims the benefit under 35 U.S.C. §119(e) of U.S. Provisional Application No. 60/685,537, filed May 31, 2005, in the United States Patent and Trademark Office, and the benefit under 35 U.S.C. §119(a) of Korean Patent Application No. 2006-0047945, filed May 29, 2006, in the Korean Intellectual Property Office, the entire contents of both of which are hereby incorporated by reference.

BACKGROUND OF THE INVENTION

1. Field of the Invention

The present invention relates to a multi-channel communication method for wireless local area network (WLAN) devices with a single radio interface. More particularly, the present invention relates to a multi-channel media access control (MAC) method for WLAN devices with a single radio interface.

2. Description of the Related Art

For the past decade the Institute for Electrical and Electronics Engineers (IEEE) 802.11 standards have provided interoperability among WLAN devices. IEEE 802.11 has also succeeded in implementing timely amendments to the standard (for example, 802.11a, 802.11g, 802.11e, 802.11i, and 802.11n) addressing the different needs that become evident with time. Presently, 802.11s is being developed to define wireless mesh links between WLAN devices.

An important part of the IEEE WLAN standards have been addressing the link between an access point (AP) and its stations (STAs). A prevalent topology for networking between APs and STAs is a basic service set (BSS) network where a set of STAs is controlled by a single coordinator, the AP. A system used to interconnect a set of APs and the integrated local area network (LAN) is called the distribution system (DS). The DS is primarily a wired network. An important objective of 802.11s is to specify functionality that will allow access points (APs) to communicate wirelessly with each other (thereby extending the current wired distribution system (DS) and form a wireless distribution system (WDS)) as well as allow 802.11s nodes to relay traffic on behalf of each other (multi-hop communication).

FIG. 1 schematically illustrates WLAN mesh network components.

In contrast to an STA in a BSS network, the basic unit in a 802.11s mesh network, as shown in FIG. 1, is a mesh point (MP) 100. MPs can relay frames on behalf of other MPs, hop-by-hop, as a router does in wired networks. It can also be seen from FIG. 1 that WLAN mesh network also provides wireless links among APs referred to as mesh access points (MAPs) 110. As the wireless links do not require wired infrastructure, and the goal is to configure these devices in an unmanaged fashion, the expectation is that deployment of WLAN mesh networks can be accomplished promptly to cover a wide service range.

While MAC-layer routing and management framework for mesh networks are also key components of the WLAN mesh network, the present invention focuses on the MAC related aspects dealing with the multi-channel operation. A WLAN access control scheme defines a mechanism in which at least two MPs can communicate with each other in one channel. The multi-channel operation based on the single radio interface is an access scheme using one channel. Specifically, a channel to be commonly used between all devices is referred to as a "common channel."

When the common channel has changed to a different channel for multi-channel operation in MPs with a single radio interface, the common channel state can be no longer detected. In other words, an MP cannot communicate with an arbitrary MP on the common channel. Although a sender MP selects the data channel to be used for data transmission by exchanging Request to Send (RTS) and Clear to Send (CTS) frames with a recipient MP on common channel, the sender MP cannot listen to RTS and CTS frames on other channels. Moreover, as RTS and CTS frames are devised to address the hidden-node problem, such an MP may destroy on-going data transmissions after switching the channel.

SUMMARY OF THE INVENTION

Exemplary embodiments of the present invention address at least the above problems and/or disadvantages and provide at least the advantages described below.

It is an object of exemplary embodiments of the present invention to provide a multi-channel media access control (MAC) method that is compatible with the existing IEEE 802.11 standard.

It is another object of exemplary embodiments of the present invention to provide a multi-channel media access control (MAC) method that does not require WLAN devices to have multiple radios.

It is another object of exemplary embodiments of the present invention to provide a multi-channel media access control (MAC) method that provides a framework which is simple and extensive in that different scenarios can be supported.

In accordance with an exemplary aspect of the present invention, there is provided a multi-channel media access control (MAC) method for Wireless Local Area Network (WLAN) devices with single radio interface. The method comprises starting a channel coordination window (CCW) that is repeated with a period P, allocating an arbitrary WLAN device pair on a common channel to a destination channel by using a channel utilization vector that indicates whether each of N channels is occupied or available during the CCW, and switching the arbitrary WLAN device pair to the destination channel.

BRIEF DESCRIPTION OF THE DRAWINGS

The above and other objects and exemplary aspects of the present invention will become more apparent from the following detailed description of certain exemplary embodiments taken in conjunction with the accompanying drawings, in which.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Exemplary embodiments of the present invention are intended to provide a common channel framework (CCF) designed to enable devices with a single radio interface to operate in multi-channel operation, while not restricting devices with multiple radio interfaces in any way. Central to CCF is the common channel. To legacy devices (STAs and AP not implementing 802.11s), the common channel appears as any other channel and the operation of the legacy device remains unaffected.

Using CCF, device pairs, or clusters, select a different channel and switch to that channel for a short period of time, after which they return to the common channel. During this time, devices exchange one or more DATA frames. The channel coordination itself is carried out on the common channel by exchanging control frames or management frames that carry information about the destination channel. In this way, simultaneous transmission on multiple channels is achieved.

Single-radio MPs that switch to another channel do not know the network status on the common channel, for example, correct network allocation vectors (NAVs), availability of neighboring nodes, and so on. A multi-channel MAC protocol developed to support single radio MPs should therefore address the following two issues: 1) facilitate connectivity among arbitrary MPs that may dwell on different channels; and 2) facilitate protection of the on-going transaction that may be destroyed due to missing network status information.

In order to address the foregoing issues, the following measures are taken. First, the concept of a channel coordination window (CCW) is introduced in the framework. At the start of the CCW, all MPs in the mesh network tune to the common channel. This enables arbitrary MPs to establish communication with each other. Second, at the start of the CCW, the channel occupancy status is reset and MPs can pick from available channels. Once a channel is picked by an MP, the channel is marked as "unavailable" by all MPs that have observed it. The CCW is repeated with a period P, and the duration of the CCW usually comprises a fraction of P.

Figure 1:
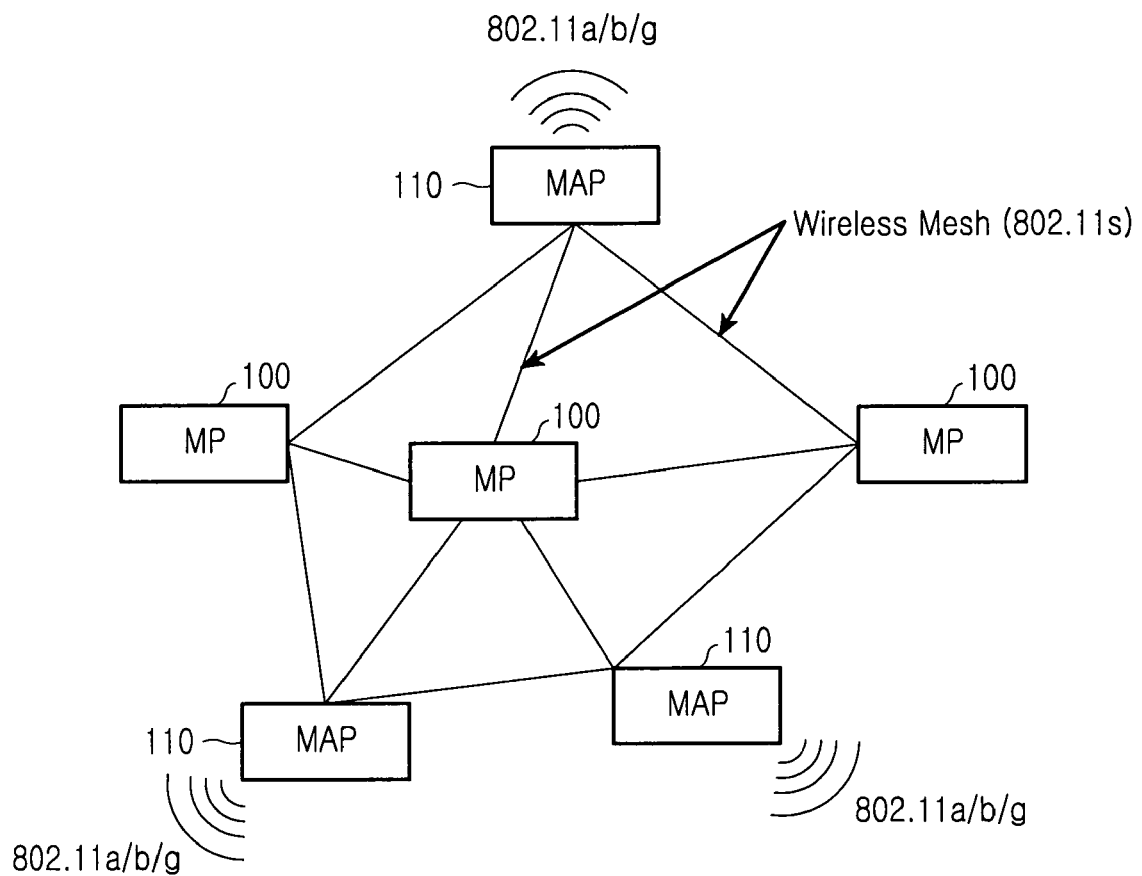
FIG. 1 schematically illustrates Wireless Local Area Network (WLAN) mesh network components.
Figure 2:
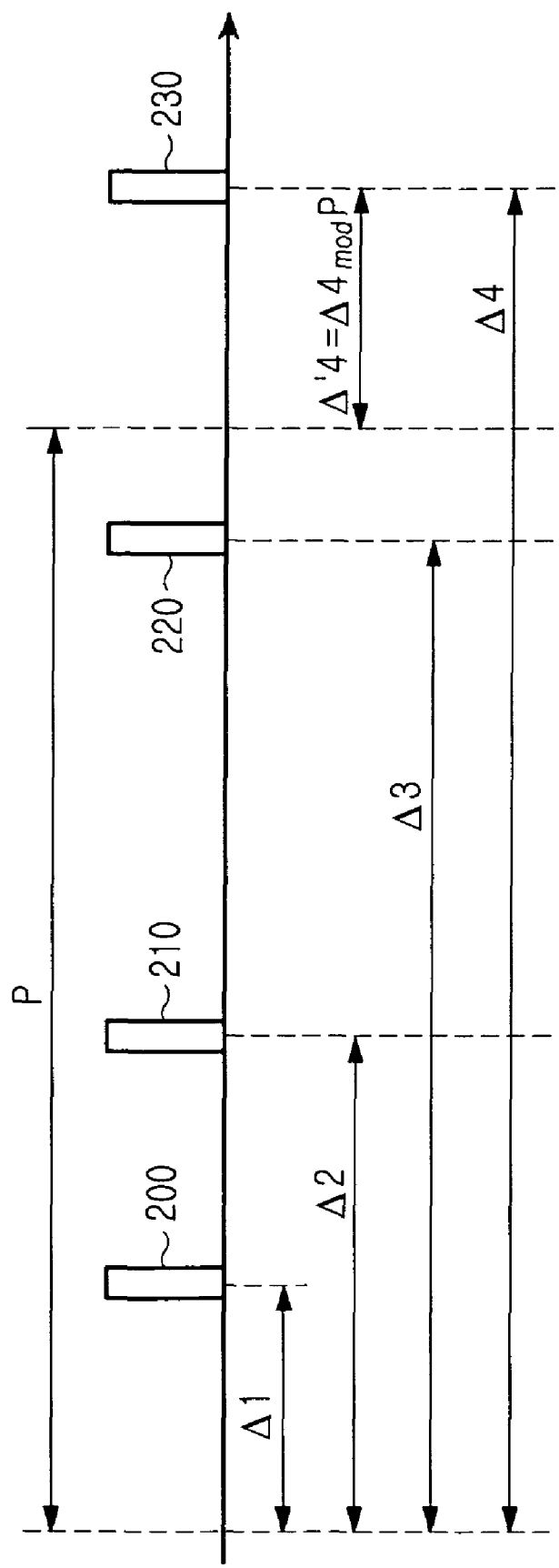
FIG. 2 illustrates distribution and synchronization of relevant parameters within common channel framework in accordance with an exemplary embodiment of the present invention.

FIG. 2 illustrates distribution and synchronization of relevant parameters within CCF in accordance with an exemplary embodiment of the present invention.

Referring to FIG. 2, the parameters CCW and P are carried in beacon frames. The values of P and CCW should be advertised to all MPs in the mesh network. The distribution of P and CCW is illustrated in FIG. 2, where four beacon frames 200, 210, 220, and 230 are shown. An offset Δ is the time (expressed in modulo P) elapsed after the start of P. MPs simply relay the values of P and CCW by copying these values from the beacons received from other MPs. Each MP computes its own Δ prior to transmission of the beacon frame.

An MP starts to scan beacons 200, 210, 220, and 230 through an association process of the conventional WLAN. If a beacon is not scanned, the MP transmits a beacon with its own window period P and CCW values. The window period P and CCW values are carried and transmitted in a WLAN information element of a beacon. When each MP transmits the beacon, the offset (α) is transmitted along with the window period P and CCW values. The offset is an elapsed time after the start of the current window period P, and corresponds to the remainder computed by dividing a hardware timer value by P without synchronization based on the hardware timer value.

The CCF also facilitates channelization between BSS and Wireless Distribution Service (WDS) traffic in that an MAP may switch to the BSS channel after CCW, thereby enabling the MAP to handle WDS as well as BSS traffic. In addition, the framework can support channelization within WDS, for instance, by allowing the formation of ad-hoc clusters that switch to the agreed-upon channels after ccw.

Channel Coordination Mechanism

Figure 3:
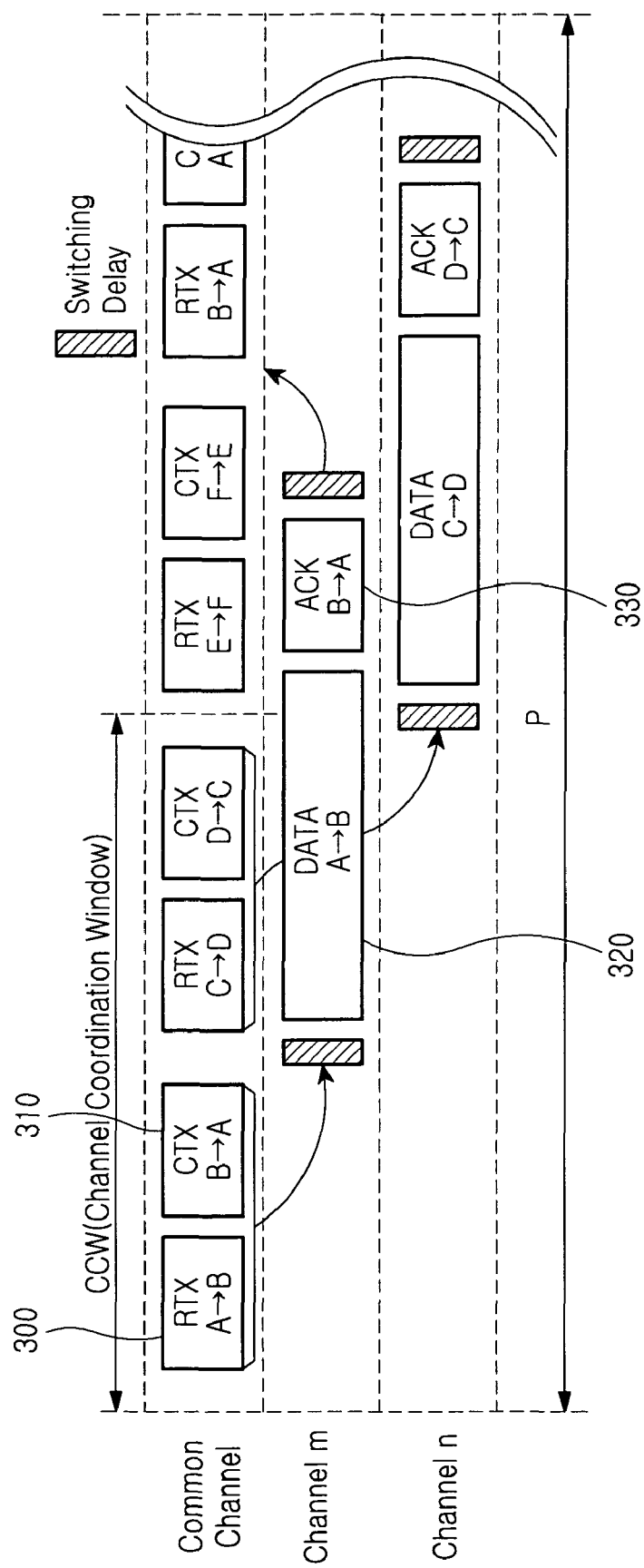
FIG. 3 illustrates a channel coordination mechanism on the common channel framework in accordance with an exemplary embodiment of the present invention.

FIG. 3 illustrates a channel coordination mechanism on the common channel framework in accordance with an exemplary embodiment of the present invention.

As shown in FIG. 3, an arbitrary MP pair on the common channel can initiate transmission by sending a Request to Switch (RTX) frame on the common channel. The receiving MP accepts this request by transmitting a Clear to Switch (CTX) frame carrying the same destination channel information. It may decline this request by setting the destination channel index to the common channel. As the two frames are new, legacy STAs only update NAV according to the value specified in the duration/ID field. The duration specified in RTX/CTX frames does not include the dwell time on the destination channel so that the common channel is not unnecessarily idle.

An MP selects a destination channel to which it switches for transmitting frames. To facilitate channel selection, MPs use a channel utilization vector (U) of N channels, such as the following equation (1).

$$U=[u_1, u_2, \ldots, u_N] \qquad (1)$$

where $u_i \in \{0,1\}$, $u_i=0$ indicates that channel $u_i$ is available, and $u_i=1$ indicates that $u_i$ is occupied. At the start of a CCW, U is reset in accordance with the available channel list. The bits in U corresponding to those channels that need to be avoided, for instance, due to dynamic frequency selection (DFS) requirements, are retained at "1." The other bits are set to "0." Each MP updates U in accordance with successful requests. After an MP switches to a different channel and returns to the common channel, it no longer assumes that channels marked as $u_i=0$ are available. Those MPs that return back to the common channel after a successful data exchange, and are unsure of the channel utilization states, restrict RTX signaling to a previously successful destination channel only.

If the receiving MP accepts the RTX request, the MP pair switches to the destination channel within a switching delay $T_s$ microseconds. Exactly $T_s$ μs, which in some exemplary embodiments is shorter than 100 μs, after the completion of the CTX frame, the transmitting MP performs a clear channel assessment (CCA) for the duration of distributed interframe space (DIFS). If the channel is found to be clear, it can send a DATA frame. Otherwise, it returns back to the common channel. If the receiving MP does not receive a DATA frame for short interframe space (SIFS)+slot time after switching the channel or after sending an ACK, it returns back to the common channel. If the transmitting MP does not receive an ACK frame in SIFS+slot time after sending a DATA frame, the transmitting MP switches back to the common channel. After returning to the common channel the transmitting MP initiates the backoff procedure. Retransmission can take place either on the common channel or on the destination channel.

An MP that did not succeed in obtaining a channel during CCW may select a channel based on its channel utilization vector (U), even after CCW. MPs can continue to exchange RTX and CTX even after CCW and indicate a destination channel that is marked as available.

To prevent STAs from transmitting on the common channel during CCW, a MAP may choose to selectively silence the STAs while leaving MPs clear to transmit by sending a Clear to Sender (CTS) frame whose destination address set to a unique mesh address known a priori to all MPs. The duration for silencing can be as long as the CCW duration.

In accordance with the above description, the multi-channel operation during CCW will be described with reference to an example of FIG. 3. When MP A has a data frame for MP B, MP A checks if the following two conditions are true: 1) there is one or more available data channel, and 2) the transmission finishes within a period P.

If both are true, MP A selects one channel based on the channel utilization vector (U). MP A sends MP B RTX 300, and MP B sends MP A CTX 310. If the channel is available, MP B use the same channel index. Otherwise, MP B uses channel index 0 (common channel). If MP A receives CTX 310 with channel index 0, it updates channel utilization vector (U) and does backoff. Other MPs update channel utilization vector (U) and allocate NAV. MP A and MP B switch the channel. MP A waits for DIFS to comply with legacy behaviour. MP A sends MP B DATA 320. If the transmission opportunity (TXOP) is valid, MP A sets the duration as extended interframe space (EIFS), otherwise, MP A sets the duration as short interframe space (SIFS)+ACK.

MP B sends ACK 330. If the duration is greater than SIFS+ACK, MP B will not switch the channel. Otherwise, MP B switches to the common channel. MP A switches to the common channel if the TXOP is concluded. MP A and MP B regard the only free channel as the selected channel for further transmission, and update channel utilization vector (U) accordingly. If an error occurs, MP A and MP B tune back to the common channel.

In operation after CCW, An MP does not override the data channel selection that is agreed upon during CCW. If data channels are left available, MPs may use the data channel by using vector (U) during CCW rule. Otherwise, MPs may start transmission on the common channel by using the existing 802.11 rule, that is, distributed coordination function (DCF) and extended DCF (EDCF), as long as the transmission finishes within a period P.

Handling Different Traffic Scenarios

In addition to supporting peer-to-peer communication between MPs, the framework also supports traffic scenarios in which large amount of BSS traffic is generated. If sufficient channels are available, each MAP can place its BSS on a separate channel. MAPs can switch to their BSS channels at the end of CCW. The other MPs can remain tuned to the common channel. In this way, MAPs are available for WDS traffic during CCW. It is also possible within the framework for APs to use the common channel for BSS traffic.

Note that STAs remain completely unaffected by CCF. It is the MPs and the MAPs that switch the channel. The BSS channel selection procedure of an individual MAP is compliant with known procedures in 802.11. Therefore the multiple BSS channel approach does not need new control or management frames. The choice of a large period P may minimize the scheduling and the channel switching overhead. The specific scheme to manage scheduling parameters may vary with traffic pattern or network topology.

The following simulations have been performed by using OPNET (www.opnet.com). The nodes are configured to use the 802.11a physical (PHY) model, 24 Mbit/s are used for data transmission, and 6 Mbit/s for transmitting the control frames. The switching delay is set to 100 μs. All devices are assumed to be in radio range. Additional parameter settings are listed in Table 1.

TABLE 1

| Parameter | Value | Comment |
|---|---|---|
| $T_{slot}$ | 9 μs | Length of a slot time |
| $T_{DIFS}$ | 34 μs | Length of the distributed interframe space |
| $T_{SIFS}$ | 16 μs | Length of the short interframe space |
| Payload | 1500 | Size (bytes) of payload used in DATA frames |
| $T_{SW}$ | 100 μs | Delay used in switching to a channel |
| $T_P$ | 163 μs | The period of repetition for the CCW |
| $T_{CCW}$ | 16 μs | The duration of CCW |

Two traffic scenarios are considered in detail. The first scenario, referred to as the decentralized WDS traffic scenario, involves the situation where a node in a network is primarily interested in communicating with one other arbitrary node. The second traffic scenario, referred to as the BSS-Heavy traffic scenario, involves the situation where MAPs have some WDS traffic in addition to BSS traffic.

Decentralized WDS Traffic Scenario

For simulation purposes, it is assumed that the source and destination pair does not change during period P (on the order of 10 ms). Five different cases are simulated where one, two, three, four, and eight MP pairs are involved. Among each MP pair, it is assumed that one is a source and the other is a sink.

Figure 4:
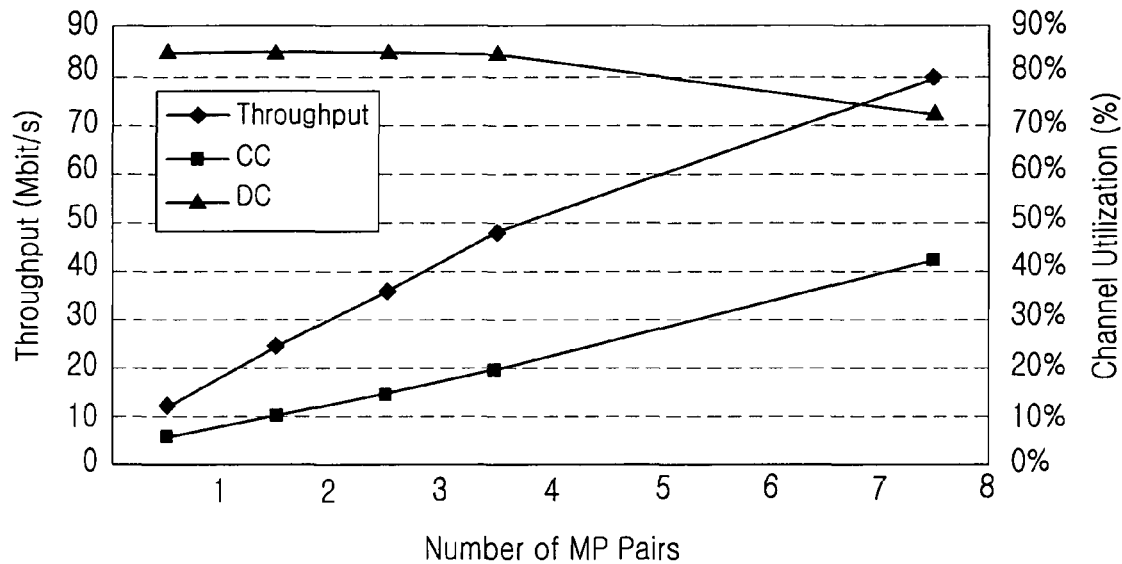
FIG. 4 is a diagram illustrating aggregate throughput and channel utilization as the number of MP pair increases in accordance with an exemplary embodiment of the present invention.

FIG. 4 is a diagram illustrating aggregate throughput and channel utilization as the number of MP pair increases in accordance with an exemplary embodiment of the present invention.

Referring FIG. 4, as the maximum is 8 MP pairs, a separate, orthogonal channel is available for each communicating MP pair in addition to the common channel. The aggregate throughput scales almost linearly with the number of channels. Besides throughput, the figure also shows channel utilization figures. Channel utilization is defined by equations (2) and (3).

$$U_{DC} = \Sigma(2T_{SW} + T_{DIFS} + T_{DATA} + T_{SIFS} + T_{ACK})/T_{sim} \quad (2)$$

$$U_{CC} = \Sigma(T_{DIFS} + T_{RTX} + T_{SIFS} + T_{CTX})/T_{sim} \quad (3)$$

where $U_{DC}$ and $U_{CC}$ refer to the channel utilization of destination channels and the common channel, respectively. $T_{RTX}$, $T_{CTX}$, $T_{DATA}$, and $T_{ACK}$ represent the air time of RTX, CTX, DATA, and ACK frames, respectively. $T_{sim}$ represents the simulation time. Until 4 MP pairs are on the channel, the destination channel utilization is maintained at about 85% on all channels, while the utilization of the common channel rises to about 20%. For 8 contending pairs, however, the common channel utilization rises to above 40% while the data channel utilization drops to about 70%. The data channel utilization dips because MP pairs, when returning to the common channel, occasionally need to defer transmission because the probability that an RTX/CTX exchange may be ongoing has increased significantly. The wait time results in loss of destination channel usage.

Figure 5:
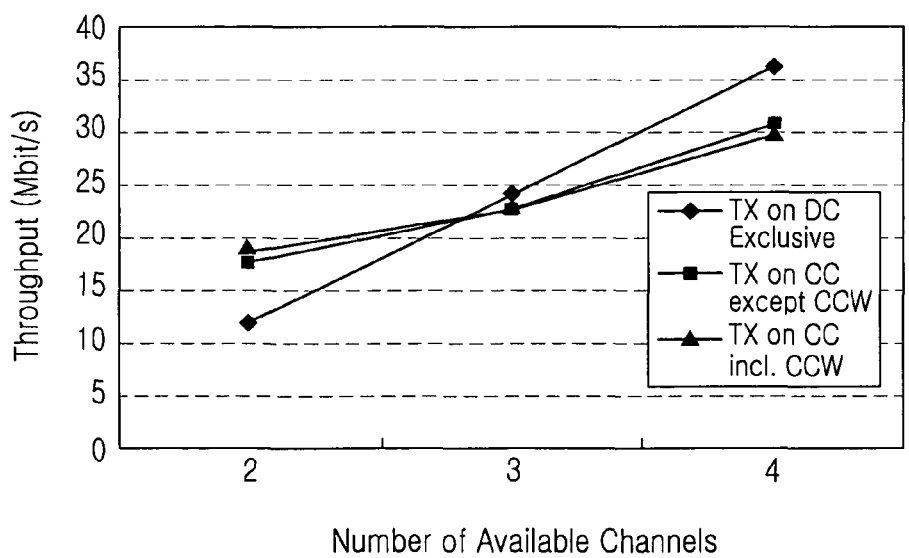
FIG. 5 is a diagram illustrating aggregate throughput and channel utilization as the number of MP pair increases with different control options in accordance with an exemplary embodiment of the present invention.

FIG. 5 is a diagram illustrating aggregate throughput and channel utilization as the number of MP pair increases with different control options in accordance with an exemplary embodiment of the present invention.

Referring to FIG. 5, the impact of the number of available channels is also simulated, that is, the number of communicating MP pairs is fixed to 4 and the number of available channels is increased from 1 to 4. Three different control options are applied: i) "Tx on DC exclusive" indicates that DATA frame transmission can only take place on a channel (destination channel) other than the common channel, ii) "Tx on CC except CCW" indicates that DATA frame transmission can take place on the common channel, but only after CCW, and iii) "Tx on CC incl. CCW" indicates that DATA frame transmission can take place on the common channel anytime.

It can be seen from FIG. 5 that the aggregate throughput drops (compared to a single channel case) when the number of available channels is two and transmission of DATA frames is not permitted on the CC. When the number of available channels is three or more, the throughput increases linearly. Because the CCW is a small fraction of period P, the contribution of CCW is quite small as seen in the "Tx on CC except CCW" and "Tx on CC incl. CCW" cases.

Figure 6:
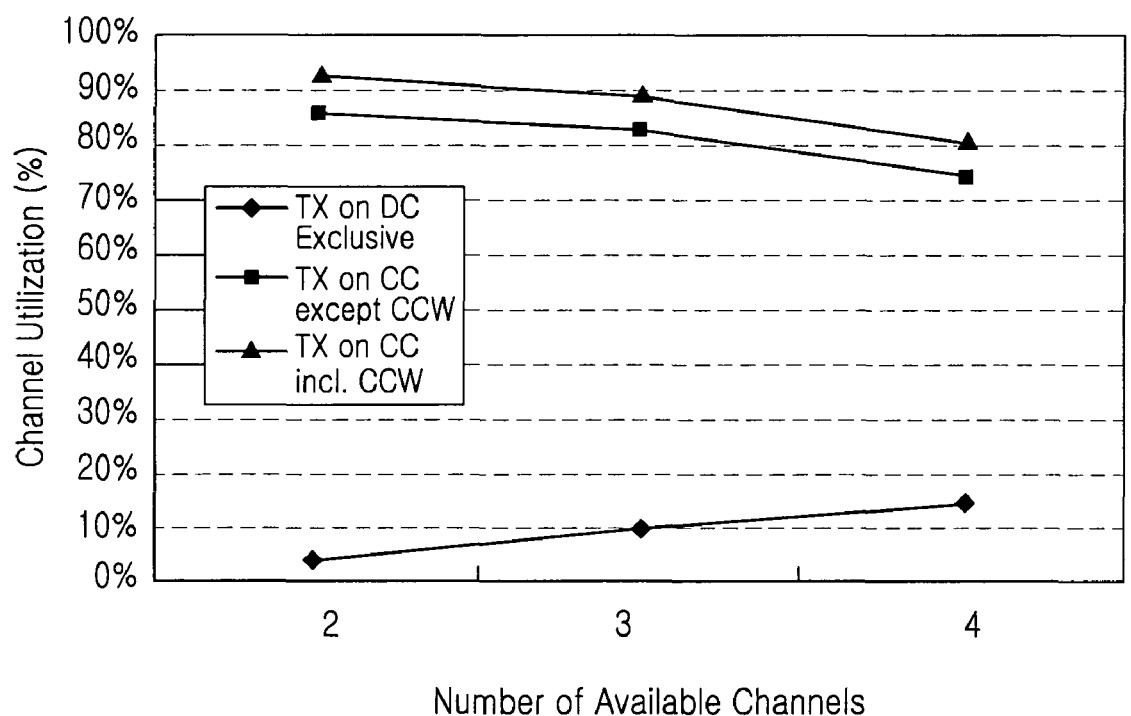
FIG. 6 is a diagram illustrating aggregate throughput and channel utilization as the number of MP pair increases with different control options in accordance with an exemplary embodiment of the present invention.

FIG. 6 is a diagram illustrating aggregate throughput and channel utilization as the number of MP pair increases with different control options in accordance with an exemplary embodiment of the present invention.

If DATA frame transmission is allowed on the common channel, the channel utilization of the common channel defined in equation (3) increases as shown in FIG. 6. This increase in the common channel utilization lessens the opportunity to branch to destination channels. Due to this, the aggregate throughput for three and four channels is smaller than that of "Tx on DC exclusive".

BSS-Heavy Traffic Scenario

Figure 7:
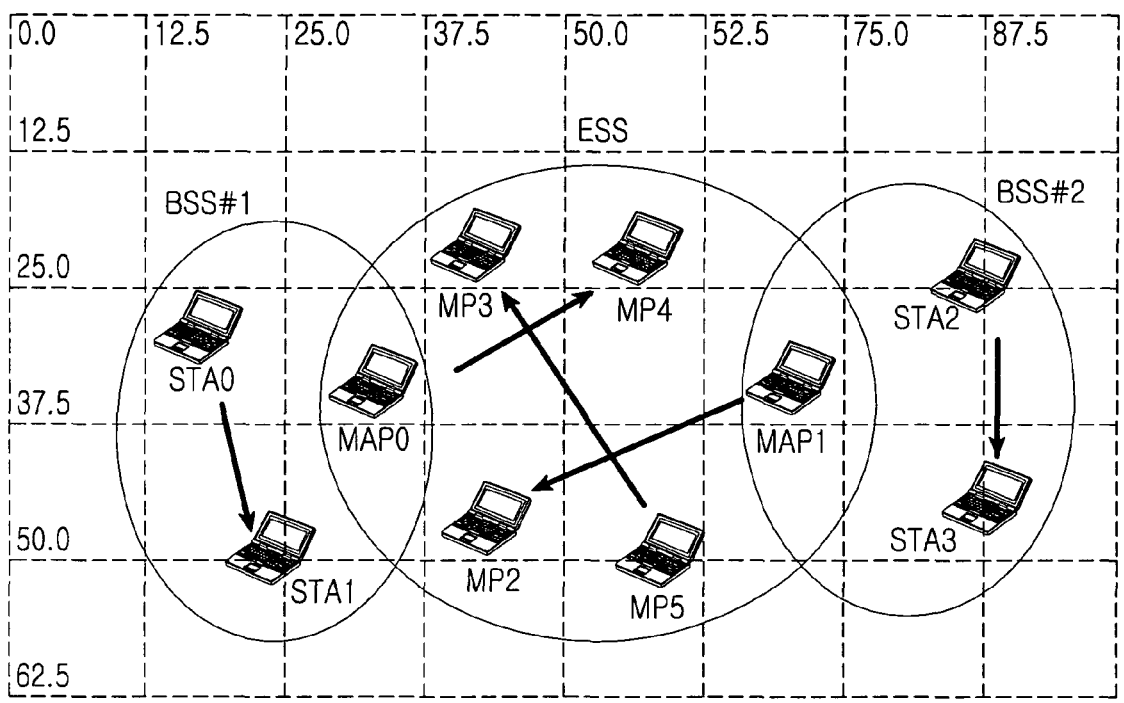
FIG. 7 illustrates a topology used for BBS-heavy traffic scenario in accordance with an exemplary embodiment of the present invention.

FIG. 7 illustrates a topology used for BBS-heavy traffic scenario in accordance with an exemplary embodiment of the present invention.

Referring to FIG. 7, MAPs have BSS as well as WDS traffic. In this scenario, it is assumed that the MAPs' BSS traffic is heavier than the WDS traffic. WDS traffic is only served during CCW. If the BSS network is located on another channel (that is, not on the common channel), the MAPs switch to the BSS channel after CCW.

The number of MAPs is either 1 or 2, and each MAP has either 2 or 4 STAs. The simulation results of this scenario are summarized in Table 2 (the throughput of single channel MAC≈16.05 Mbit/s).

TABLE 2

| # MAPs | # STAs per MAP | Througput (Mbit/s) | Channel Utilization | | |
|---|---|---|---|---|---|
| | | | WDS | BSS1 | BBS2 |
| 1 | 2 | 31.170 | 0.967 | 0.828 | N/A |
| | 4 | 31.978 | 0.964 | 0.875 | N/A |

TABLE 2-continued

| # MAPs | # STAs per MAP | Througput (Mbit/s) | Channel Utilization | | |
|---|---|---|---|---|---|
| | | | WDS | BSS1 | BBS2 |
| 2 | 2 | 46.476 | 0.963 | 0.827 | 0.827 |
| | 4 | 48.099 | 0.948 | 0.875 | 0.875 |

In case of one MAP, 2 channels are used (common channel plus one other channel) while in case of two MAPs, three channels are used. With respect to a single channel case, where the maximum throughput is approximately 16.05 Mbit/s, the throughput increase is significant. It is known that the CCF allows BSS to be located on different channels while providing the possibility to carry out WDS traffic.

As is apparent from the above description, exemplary embodiments of the present invention have presented a multi-channel MAC method that: i) is compatible with the existing 802.11 standard, ii) does not require WLAN devices to have multiple radios, and iii) provides a framework that is simple and extensible in that different traffic scenarios can be supported. Simulation results show that significant gains can be obtained in certain scenarios.

While the present invention has been particularly shown and described with reference to certain exemplary embodiments thereof, it will be understood by those of ordinary skill in the art that various changes in form and detail may be made therein without departing from the spirit and scope of the present invention as defined by the appended claims and equivalents thereof.

What is claimed is:

1. A multi-channel media access control (MAC) method for Wireless Local Area Network (WLAN) devices with single radio interface, the method comprising:
    starting a channel coordination window (CCW) that is repeated with a period P;
    selecting a destination channel for an arbitrary WLAN device pair on a common channel by using a channel utilization vector that indicates whether each of N channels is occupied or available during and the CCW;
    switching the arbitrary WLAN device pair from the common channel to the destination channel; and
    returning the arbitrary WLAN device pair back to the common channel after a successful data exchange,
    wherein the data exchange is performed through the destination channel.

2. The method of claim 1, wherein the channel utilization vector is expressed by the following equation:

$$U=[u1, u2, \ldots, uN],$$

where ui $\hat{1}\{0,1\}$, ui=0 indicates that channel ui is available, and ui=1 indicates that ui is occupied.

3. The method of claim 1, wherein the channel utilization vector is reset in accordance with an available channel list at the start of the CCW.

4. The method of claim 1, wherein the arbitrary WLAN device pair is switched by exchanging Request to Switch (RTX) and Clear to Switch (CTX) frames.

5. The method of claim 1, wherein each of the WLAN devices updates the channel utilization vector in accordance with a successful request.

6. The method of claim 1, wherein a WLAN device with access point functionality among the WLAN devices sends Clear to Sender (CTS) frame to silence its stations (STAB) before the start of the CCW.

7. The method of claim 1, wherein a WLAN device with access point functionality among the WLAN devices sets a duration field that covers its period of absence from the common channel.

8. The method of claim 1, wherein the arbitrary WLAN device pair did not succeed in allocating a channel during the CCW may be allocated a channel based on its channel utilization vector even after the CCW.

9. The method of claim 1, wherein the arbitrary WLAN device pair can continue to exchange Request to Switch (RTX) and Clear to Switch (CTX) even after the CCW, and indicate a destination channel that is marked as available.

10. A Wireless Local Area Network (WLAN) system, comprising:
a plurality of WLAN devices with single radio interface under multi-channel media access control (MAC); and
a communication channel framework for:
starting a channel coordination window (CCW) that is repeated with a period P;
selecting a destination channel for an arbitrary WLAN device pair on a common channel by using a channel utilization vector that indicates whether each of N Channels is occupied or available during and the CCW;
switching the arbitrary WLAN device pair from the common channel to the destination channel; and
returning the arbitrary WLAN device pair back to the common channel after a successful data exchange,
wherein the data exchange is performed through the destination channel.

11. The system of claim 10, wherein the channel utilization vector is expressed by the following equation:

$$U=[u1, u2, \ldots, uN],$$

where $ui \in \{0,1\}$, $ui=0$ indicates that channel $ui$ is available, and $ui=1$ indicates that $ui$ is occupied.

12. The system of claim 10, wherein the channel utilization vector is reset in accordance with an available channel list at the start of the CCW.

13. The system of claim 10, wherein the arbitrary WLAN device pair is switched by exchanging Request to Switch (RTX) and Clear to Switch (CTX) frames.

14. The system of claim 10, wherein each of WLAN devices updates the channel utilization vector in accordance with a successful request.

15. The system of claim 10, wherein a WLAN device with access point functionality among the WLAN devices sends Clear to Sender (CTS) frame to silence its stations (STAs) before the start of the CCW.

16. The system of claim 10, wherein a WLAN device with access point functionality among the WLAN devices sets a duration field that covers its period of absence from the common channel.

17. The system of claim 10, wherein the arbitrary WLAN device pair did not succeed in allocating a channel during the CCW may be allocated a channel based on its channel utilization vector even after the CCW.

18. The system of claim 10, wherein the arbitrary WLAN device pair can continue to exchange Request to Switch (RTX) and Clear to Switch (CTX) even after the CCW, and indicate a destination channel that is marked as available.

19. The method of claim 1, wherein the WLAN devices are part of a mesh network, and the method further comprises tuning all of the WLAN devices in the mesh network to the common channel at the start of the CCW.

20. The method of claim 1, wherein the WLAN devices are part of a mesh network, and the method further comprises, at the beginning of the CCW, resetting a channel occupancy status so as to enable all of the devices in the mesh network to pick from available channels.

21. The system of claim 10, wherein the WLAN devices are part of a mesh network, and all WLAN devices in the mesh network tune to the common channel at the start of the CCW.

22. The system of claim 10, wherein the WLAN devices are part of a mesh network, and at the beginning of the CCW, a channel occupancy status is reset so as to enable all of the devices in the mesh network to pick from available channels.

23. The method of claim 4, wherein the Request to Switch (RTX) and Clear to Switch (CTX) frames are communicated between the arbitrary WLAN device pair over the common channel.

24. The method of claim 4, wherein the arbitrary WLAN device pair comprises a requesting WLAN device and a receiving WLAN device,
wherein the requesting WLAN device communicates to the receiving WLAN device the Request to Switch (RTX) frame which corresponds to a request to initiate transmission and which comprises a requested destination channel, and
wherein in response to receiving the Request to Switch (RTX) frame, the receiving WLAN device communicates to the requesting WLAN device the Clear to Switch (CTX) frame which corresponds to a response to a request to initiate transmission and which comprises a confirmed destination channel, the Clear to Switch (CTX) frame being configured such that (i) if the receiving WLAN device accepts the request to initiate transmission, the confirmed destination channel is identical to the requested destination channel, and (ii) if the receiving WLAN device denies the request to initiate transmission, the confirmed destination channel is set to the common channel.

* * * * *